United States Patent [19]
McLelland et al.

[11] 3,712,261
[45] Jan. 23, 1973

[54] FAIRING

[75] Inventors: Jack I. McLelland, Palos Verdes Peninsula; Theodore F. Mangels, Newport Beach, both of Calif.

[73] Assignee: Ocean Science and Engineering Inc., Washington, D.C.

[22] Filed: April 1, 1971

[21] Appl. No.: 130,374

[52] U.S. Cl. ............................................. 114/235 F
[51] Int. Cl. .............................................. B63b 21/00
[58] Field of Search ................................. 114/235 F

[56] References Cited

UNITED STATES PATENTS

| 3,440,993 | 4/1969 | Taylor et al. | 114/235 F |
| 2,401,783 | 6/1946 | Wilcoxon | 114/235 F |
| 2,397,957 | 4/1946 | Freeman | 114/235 F |

Primary Examiner—Trygve M. Blix
Attorney—John J. Byrne

[57] ABSTRACT

A continuously applied fairing consisting of a preformed resilient tubular member of indeterminate length which can be opened and wound as a flat strip. When unwound, it is fed into engagement with a line and is allowed to assume its normal tubular shape encompassing said line.

12 Claims, 4 Drawing Figures

PATENTED JAN 23 1973 3,712,261
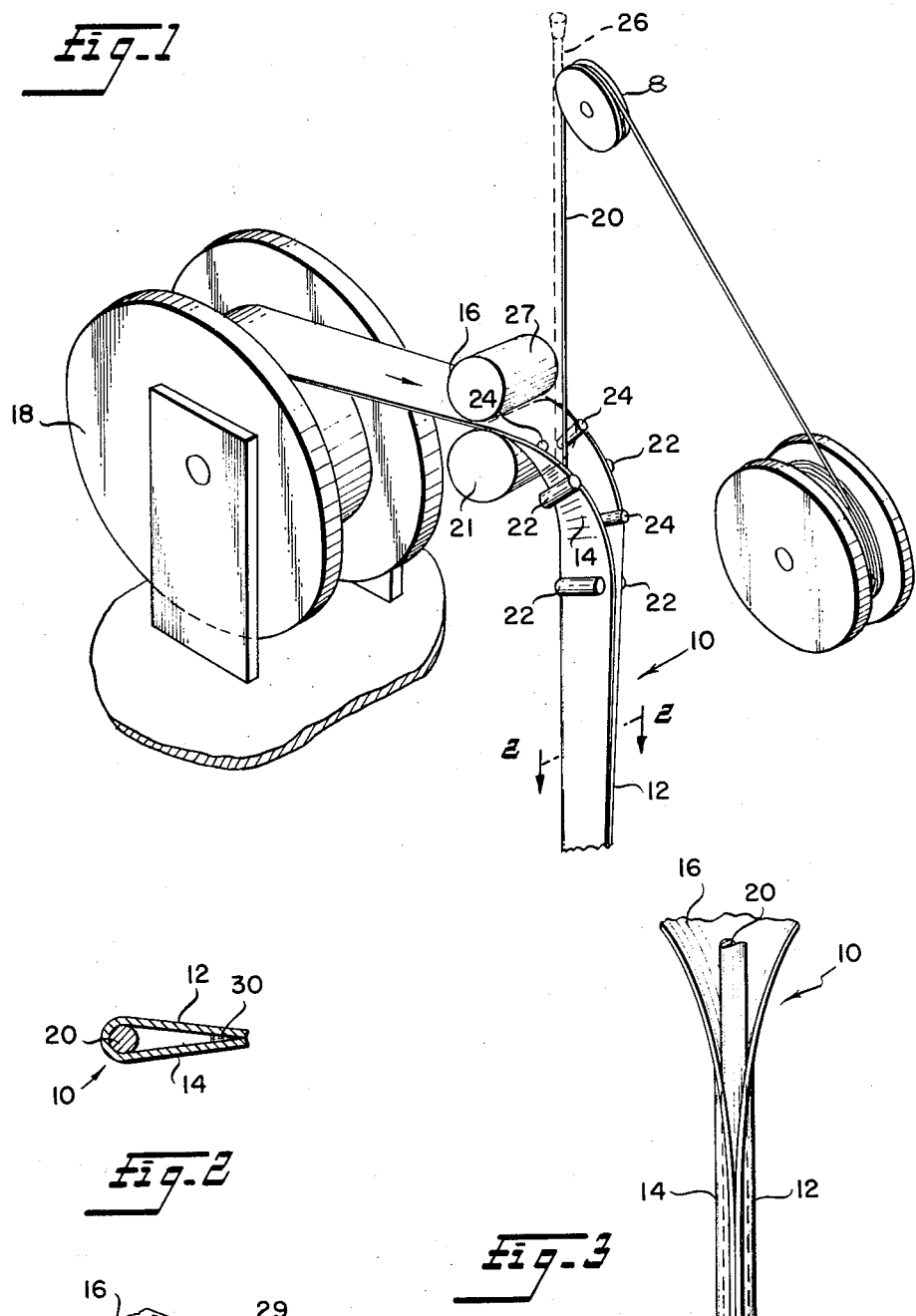
INVENTOR.
Jack I. McLelland
Theodore F. Mangels
BY
John J. Byrne
ATTORNEY

FAIRING

This invention relates to fairing for lines of indeterminate length and to the method and apparatus for applying the fairing to the lines. Specifically, this invention relates to the continuous application and removal of fairing from a line. "Line" as used in this application refers to any elongated element to be faired, such as a cable, an electrical or fluid conduit, rigid pipe, etc.

Fairing is applied to cables, pipe lengths or other elongated objects that are carried through water to reduce the drag or friction acting upon the cable. Fairing has been used to a great extend on towed cables or ropes or the like to help the cable "cut" through the water.

There are now many other uses for fairing other than for towing cables or ropes. The advances in ocean technology have given rise to many and varied ocean floor operations wherein a module or the like traverses the ocean floor or is otherwise employed on the floor, and is controlled by a mothership via a variety of lines — electric cables, hydraulic flexible tubing, air hoses, support cables and, in some cases, rigid pipe. When working in great depths, the service lines are particularly susceptible to the drag and other forces produced by reaction with the water. Fairing helps to reduce vibrations in the lines and to reduce drag or friction.

Though fairing reduces the drag, the problem of applying and removing the fairing still exists. Generally, a line is faired by attaching individual segments which are not readily removable. That is, once the fairing is applied it is considered a permanent part of the line. In some instances the line itself is formed with fairing-shaped cross section. In any case it is quite difficult to reel in a faired line since the fairing and line must be reeled upon itself requiring a large and bulky reel.

The best way to solve the problem is to provide a readily and continuously attachable and removable fairing such that the fairing may be wound on one reel and the line on another eliminating the need for large bulky reels. U.S. Pat. No. 2,401,783 to Kenneth H. Wilcoxen discloses a fairing which may be continuously applied and removed from a line. Wilcoxen presents only a partial solution to the problem, however, in that the fairing shown therein is relatively bulky and requires a large, bulky reel. Further, the fairing in the Wilcoxen patent is rather complicated in that it requires the use of spring latches and further requires means for opening the latches, which means must be precise in its operation to insure proper registry of the line and fairing.

It is an object of this invention to provide fairing for lines including cables, pipes, flexible conduits, etc., to be placed under water wherein the fairing may be continuously applied and removed from the line in an easy manner.

It is a further object of this invention to provide fairing which is normally in a fairing configuration characterized by a hollow tear-drop shaped, cross section, but which may be opened and stressed, within the yield strength, into a flat, flexible strip form for winding onto a reel. The result is that a conventional reel of small proportions may be employed.

It is a specific object of this invention to provide a continuously applied fairing which is formed by feeding a continuous flat strip or ribbon of metal through a set of dies to form a hollow, tear-drop cross section by bending the strip along its longitudinal axis. The fairing is inherently resilient to normally be biased to the closed position wherein the side edge portions of the strip or ribbon are in clamping parallel, abutting relationship and the longitudinal mid-section of the strip is bulbed out to form the main body portion of the tear-drop cross section. The fairing subsequently may be opened against its inherent spring action and laid out flat by winding onto a storage reel. A thin metal of high yield strength is used so that when it is run out off the spool again, it will spring back into the faired shape. The fairing may also be of a high-strength, elastic plastic-similar to a shirt collar stay - that could be heat-formed and set in a tubular shape, but stretched flat when rolled for storage. In other embodiments, the fairing could be of an extruded, resilient plastic such as neoprene, or of a non-corrosive metal such as nickel-copper or marine phosphorbronze. The fairing may be strong enough to support its own weight, the weight of the line within the fairing, the weight of the equipment, such as sensors, attached to the line, as well as to withstand the tensile forces resulting from drag or the assembly may be provided with suitable reinforcing wires or the like to give it sufficient strength.

Further, the fairing may be used also as a conduit in itself, with a seal being effected along the longitudinal abutting side edges of the strip.

Another object of this invention is to provide a device for continuously applying and removing fairing from a line comprising a line reel and a fairing reel and guide means to feed the fairing and the line into fairing relationship. Said guide means comprises suitably spaced top and bottom rollers or guides through which the fairing passes as it leaves the reel maintaining the strip in its flat configuration until it is in fairing relationship with the line. The path of the rollers or guides converge at that point allowing the strip to close to its faired tear-drop configuration encompassing the line.

It is a further object of this invention to provide a method of fairing a line whereby fairing in flat strip form and the line are fed into fairing relationship and the strip is allowed to assume a tear-drop fairing configuration about said line.

These and other objects of the invention will become more apparent to those skilled in the art by reference to the following detailed description when viewed in light of the accompanying drawings wherein;

FIG. 1 is a perspective view of the fairing of this invention and the device for applying it to a line;

FIG. 2 is a cross sectional view of the fairing of this invention taken on line 2—2 of FIG. 1;

FIG. 3 is a front view showing the fairing and line entering into fairing relationship; and FIG. 4 is a perspective view of a modified form of this invention.

The fairing of this invention is indicated generally by the numeral 10. The fairing is manufactured of a flexible ribbon of indeterminate length which has been preformed into a resilient, hollow, elongated tube of tear-drop cross section. The fairing of the tear-drop cross section is formed by passing the strip through a series of dies which bend the ribbon about its longitudinal axis at its mid portion such that the side edge portions 12 and 14 normally meet in clamping, abutting, parallel relationship as indicated in FIG. 2. The dies cause a prestressing of the material such that it will normally maintain its shape or configuration as shown in FIG. 2, defining a hollow, tear-drop cross section. It is to be understood that the fairing may be extruded into its tear-drop configuration or otherwise preformed without departing from the scope of the invention.

The fairing side portions 12 and 14 can be separated and the fairing spread into a flat strip of ribbon 16 to be wound about a reel 18. A conventional reel of relatively small size may be used as compared with the large, bulky reels required for prior art fairing.

As shown in FIG. 1, when it is desired to apply the fairing to a line 20, which may be an electrical conductor, a flexible fluid conduit, cable, rigid pipe, or other filament or elongated type material, the flat strip 16 is fed from the fairing reel 18 between friction rolls 21 and 27 and through upper and lower guide rolls 22 and 24 respectively. The line is fed from reel 19 over guide pulley 8. As shown, the rolls are mounted in converging paths permitting the fairing to assume its normal shape as it is fed downwardly into fairing relationship with the line. As the fairing proceeds through the guide rolls it increasingly encompasses the line until the side portions meet in clamping relationship and the line is completely faired as shown in FIG. 2. The line is fed from line reel 6 or other suitable means. It may be that the element to be faired is an elongated rigid tubing or the like which may be fed in a straight line as generally indicated by the numeral 26. It is to be understood that the guide rolls do not cause the strip to close, rather the guide rolls keep the strip open until it is in position to encompass the line. The reels are connected to suitable power sources for reeling and unreeling the line and fairing respectively. As shown in FIG. 2, a sealant 30 of an elastomeric material or the like can be provided along one or both of the longitudinal edges of the fairing to render it waterproof.

When the line and fairing are reeled in, the fairing again passes through the upper and lower guide rolls 22 and 24 which cause the side edge portions 12 and 14 to spread apart as indicated. The fairing is fed at an angle to the path of travel of line 20 allowing the line to exit from the fairing. The fairing is further spread into flat strip form and is wound about reel 18.

As mentioned earlier, the fairing may be of a suitable elastic or resilient plastic material with suitable reinforcing means and tensile wires therein to provide the fairing with the necessary strength to support the weight of equipment below the surface of the water in addition to its own weight and the weight of the line. The suspended weight is supported by the roll 21 in conjunction with frictionally cooperating roll 27 and the reel 18. Alternatively, as shown in FIG. 4, the roll 28 having sprocket teeth 31 thereon may be substituted for the roll 21. The teeth 31 engage spaced apertures 29 in the fairing 16 for better control of the feeding and reeling in of the fairing. Also, as shown in FIG. 4, channels 32 and 33 forming converging paths away from said reel may be substituted for the guide rolls 22 and 24.

The fairing itself may be used as a fluid conduit if the need arises. Depending on the situation, the fairing can be reeled out without the line, forming a hollow conduit for fluid conveying purposes. Hence, the fairing of this invention can perform dual functions.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. A fairing to be applied to a line to be carried through water for the purpose of reducing drag, comprising an elongated hollow tubular member of spring material enclosing said line, said member being split along one side thereof longitudinally to define two adjacent edge portions, said hollow member normally assuming said tubular configuration but being spreadable into a substantially flat strip for winding onto a reel, said hollow member having a streamlined cross section.

2. A fairing as defined in claim 1 wherein said streamlined cross section is of a tear-drop.

3. A fairing as defined in claim 1 wherein said spring material is a non-corrosive metal.

4. A fairing as defined in claim 1 wherein said spring material is a high-strength plastic material.

5. A fairing as defined in claim 1 and including a sealant disposed between said adjacent edge portions.

6. A method of continuously applying fairing to an elongated element of indeterminate length comprising the steps of feeding a substantially flat strip of indeterminate length, said strip being of a spring material and normally biased about its longitudinal axis to a substantially closed position to define a hollow streamlined cross section, feeding said elongated element into faired relationship with said fairing and in the same direction, and allowing said strip to assume its normal configuration encompassing said elongated element.

7. Apparatus continuously applying and removing fairing from a line wherein the fairing is formed from an inherently resilient flat strip normally biased to a substantially closed position defining a hollow cross-section, comprising a first feed reel for receiving said fairing in flat strip form, a second reel for receiving said line, first guide means through which said fairing strip is fed, second guide means through which said line is fed, said first guide means directing said fairing strip into fairing relationship with said line whereby said first guide means forms two converging paths permitting said strip to assume its substantially closed position encompassing said line.

8. The apparatus of claim 7 wherein said first guide means comprises upper and lower rolls forming converging paths away from said first reel for receiving the side edge portions of said fairing strip.

9. The apparatus of claim 7 wherein said first guide means comprises spaced channels for receiving the side edge portions of said strip, said channels forming paths converging away from said first reel.

10. The apparatus of claim 8 and including means for driving said first and second reels.

11. The apparatus of claim 7 and including a pair of friction support rolls between said first reel and said first guide means whereby said strip is fed between said support rolls.

12. The apparatus of claim 7 wherein said strip has spaced apertures extending longitudinally of the strip on each side edge portion thereof, and including a rotatable support roll between said first reel and said first guide means, and sprocket teeth on said support roll and progressively received in said apertures as the strip is fed.

* * * * *